US008459934B2

(12) United States Patent
Hofmann et al.

(10) Patent No.: US 8,459,934 B2

(45) Date of Patent: Jun. 11, 2013

(54) VARYING CROSS-SECTIONAL AREA GUIDE BLADE

(75) Inventors: Willy Heinz Hofmann, Baden-Ruetihof (CH); Roland Dueckershoff, Hoehr-Grenzenhausen (DE); Brian Kenneth Wardle, Brugg-Lauffohr (CH)

(73) Assignee: Alstom Technology Ltd, Baden (CH)

( * ) Notice: Subject to any disclaimer, the term of this patent is extended or adjusted under 35 U.S.C. 154(b) by 115 days.

(21) Appl. No.: 12/888,564

(22) Filed: Sep. 23, 2010

(65) Prior Publication Data

US 2011/0076155 A1 Mar. 31, 2011

Related U.S. Application Data

(63) Continuation of application No. PCT/EP2009/052570, filed on Mar. 5, 2009.

(30) Foreign Application Priority Data

Mar. 28, 2008 (CH) .................................... 00468/08

(51) Int. Cl.
*F01D 5/14* (2006.01)
*F02C 7/12* (2006.01)

(52) U.S. Cl.
USPC ............................................ 415/115; 60/806

(58) Field of Classification Search
USPC ................................ 60/39.17, 806; 415/115
See application file for complete search history.

(56) References Cited

U.S. PATENT DOCUMENTS 2,823,893 A 2/1958 Gerdan et al.
3,066,910 A 12/1962 Bluck
4,136,516 A * 1/1979 Corsmeier ................. 60/39.091
4,930,980 A 6/1990 North et al.
4,932,861 A 6/1990 Keller et al.
5,207,556 A * 5/1993 Frederick et al. ............. 415/115
5,393,198 A * 2/1995 Noda et al. .................... 415/115
5,454,220 A 10/1995 Althaus et al.
5,488,825 A * 2/1996 Davis et al. ..................... 60/806
5,588,826 A 12/1996 Dobbeling et al.
5,647,200 A * 7/1997 Althaus ........................ 60/39.17
5,688,104 A * 11/1997 Beabout ........................ 415/115

(Continued)

FOREIGN PATENT DOCUMENTS

EP 0321809 A1 6/1989
EP 0704657 A2 4/1996

(Continued)

OTHER PUBLICATIONS

International Search Report for CH0468/2008 dated Nov. 26, 2008.

(Continued)

*Primary Examiner* — Gerald Sung

(74) *Attorney, Agent, or Firm* — Leydig, Voit & Mayer, Ltd.

(57) ABSTRACT

A guide blade for a gas turbine includes an inner and an outer platform, an airfoil extending in a radial direction between the inner and the outer platforms and having a height in the radial direction, and at least one cooling channel disposed in an interior of the airfoil and configured to receive a cooling medium flowing through the at least one cooling channel configured to cool the guide blade, wherein a cross-sectional area of a blade material of the airfoil varies over the height.

14 Claims, 3 Drawing Sheets

U.S. PATENT DOCUMENTS

| | | | | |
|---|---|---|---|---|
| 5,813,835 | A | 9/1998 | Corsmeier et al. | |
| 7,427,188 | B2 | 9/2008 | Neuhoff et al. | |
| 2001/0021343 | A1* | 9/2001 | Kuwabara et al. | 415/115 |
| 2006/0034679 | A1* | 2/2006 | Harding et al. | 415/115 |
| 2006/0275111 | A1* | 12/2006 | Orlando et al. | 415/191 |
| 2010/0310367 | A1 | 12/2010 | Devore et al. | |

FOREIGN PATENT DOCUMENTS

| | | | |
|---|---|---|---|
| EP | 0620362 | B1 | 2/1999 |
| EP | 1908921 | A2 | 4/2008 |
| GB | 811586 | A | 4/1959 |
| GB | 811921 | A | 4/1959 |
| WO | WO 2006029983 | A1 | 3/2006 |

OTHER PUBLICATIONS

International Search Report for PCT/EP2009/052570 mailed on Oct. 4, 2010.

Joos et al., Field Experience of the Sequential Combustion System for the ABB GT24/GT26 Gas Turbine Family, IGTI/ASME 9S-GT-220,1998, Stockholm.

* cited by examiner

VARYING CROSS-SECTIONAL AREA GUIDE BLADE

CROSS REFERENCE TO PRIOR APPLICATIONS

This application is a continuation application of International Patent Application No. PCT/EP2009/052570, filed Mar. 5, 2009, which claims priority to Swiss Application No. CH 00468/08, filed Mar. 28, 2008. The entire disclosure of both applications is incorporated by reference herein.

FIELD

The present invention relates to the field of gas turbine technology. It concerns a guide blade for a gas turbine. It also concerns a gas turbine equipped with such a guide blade.

BACKGROUND

Gas turbines having sequential combustion are known and have proved successful in industrial operation.

Such a gas turbine, which has become known in specialist circles as GT24/26, can be seen, for example, from the article by Joos, F. et al., "Field Experience of the Sequential Combustion System for the ABB GT24/GT26 Gas Turbine Family", IGTI/ASME 98-GT-220, 1998 Stockholm. FIG. 1 there shows the basic construction of such a gas turbine, the FIG. 1 there being reproduced as FIG. 1 in the present application. Furthermore, such a gas turbine is apparent from EP-B1-0 620 362.

FIG. 1 shows a gas turbine 10 having sequential combustion, in which a compressor 11, a first combustion chamber 14, a high pressure turbine (HPT) 15, a second combustion chamber 17 and a low pressure turbine (LPT) 18 are arranged along an axis 19. The compressor 11 and the two turbines 15, 18 are part of a rotor which rotates about the axis 19. The compressor 11 draws in air and compresses it. The compressed air flows into a plenum and from there into premix burners, where this air is mixed with at least one fuel, at least fuel fed via the fuel supply 12. Such premix burners are apparent in principle from EP-A1-0 321 809 or EP-A2-0 704 657.

The compressed air flows into the premix burners, where the mixing, as stated above, takes place with at least one fuel. This fuel/air mixture then flows into the first combustion chamber 14, into which this mixture passes for the combustion while forming a stable flame front. The hot gas thus provided is partly expanded in the adjoining high pressure turbine 15 to perform work and then flows into the second combustion chamber 17, where a further fuel supply 16 takes place. Due to the high temperatures which the hot gas partly expanded in the high pressure turbine 15 still has, a combustion which is based on self-ignition takes place in the combustion chamber 17. The hot gas re-heated in the second combustion chamber 17 is then expanded in a multistage low pressure turbine 18.

The low pressure turbine 18 comprises a plurality of moving blades and guide blades which are arranged alternately one behind the other in the direction of flow. The guide blades of the third guide blade row in the direction of flow are provided with the designation 20' in FIG. 1.

At the high hot gas temperatures prevailing in gas turbines of the newer generation, it has become essential to cool the guide and moving blades of the turbine in a sustainable manner. To this end, a gaseous cooling medium (e.g. compressed air) is branched off from the compressor of the gas turbine or steam is supplied. In all cases, the cooling medium is passed through cooling channels formed in the blade (and often running in serpentine shapes) and/or is directed outward through appropriate openings (holes, slots) at various points of the blade in order to form a cooling film in particular on the outer side of the blade (film cooling). An example of such a cooled blade is shown in publication U.S. Pat. No. 5,813,835.

The guide blades 20' in the known gas turbine from FIG. 1 are designed as cooled blades which have cooling channels running in the interior in the radial direction, as have become known, for example, from publication WO-A1-2006029983. Such guide blades are produced with the aid of a high-tech casting process, wherein the casting material is fed from both sides (inner platform and outer platform) of the casting mold. On account of the comparatively thin walls of the airfoil and on account of the channels and openings produced for the cooling air during the casting process, the service life, the cooling air consumption and the cooling effect achieved greatly depend on the precision that can be achieved during the casting process. This is especially the case when such blades also have a pronounced spatial curvature.

SUMMARY OF THE INVENTION

The invention envisages a remedy for these problems. An aspect of the invention is to provide a guide blade which is able to maximize the service life and the cooling while taking into account the casting conditions.

In an embodiment of the invention the airfoil has a cross-sectional area of the blade material in the radial direction which varies over the height of the airfoil. As a result, the cooling behavior and the service life of the blade can be influenced in a desired manner with regard to the casting technique used. In this case, the cross-sectional area of the blade material means the difference between the entire cross-sectional area of the blade and the cross-sectional area of the cooling channels.

According to one configuration of the invention, the cross-sectional area of the blade material passes through a minimum as a function of the height of the airfoil.

In particular, the minimum cross-sectional area of the blade material lies in the region of between 20% and 40% of the total height of the airfoil.

Another configuration of the guide blade of the invention is distinguished by the fact that it has a spatially curved shape, that in the interior of the airfoil a number of cooling channels running in the radial direction are arranged one behind the other in the direction of the hot gas flow and are connected to one another by deflecting regions arranged at the ends of the airfoil or the cooling channels, that the cooling medium flows through the cooling channels one after the other in alternating direction, and that the cooling channels follow the spatial curvature of the airfoil in the radial direction.

A gas turbine is preferably equipped with such a guide blade according to the invention, the guide blade being arranged in a turbine of the gas turbine.

In particular, the gas turbine is a gas turbine having sequential combustion which has a first combustion chamber with a downstream high pressure turbine and a second combustion chamber with a downstream low pressure turbine, the guide blade being arranged in the low pressure turbine. (In this respect, see FIG. 1 already discussed above.)

The low pressure turbine preferably has a plurality of rows of guide blades one behind the other in the direction of flow, the guide blade according to the invention being arranged in a middle guide blade row.

BRIEF DESCRIPTION OF THE DRAWINGS

The invention is to be explained in more detail below with reference to exemplary embodiments in connection with the drawing. All the elements not essential for directly understanding the invention have been omitted. The same elements are provided with the same reference numerals in the various figures. The direction of flow of the media is indicated by arrows.

In the drawing.

DETAILED DESCRIPTION

Figure 1:
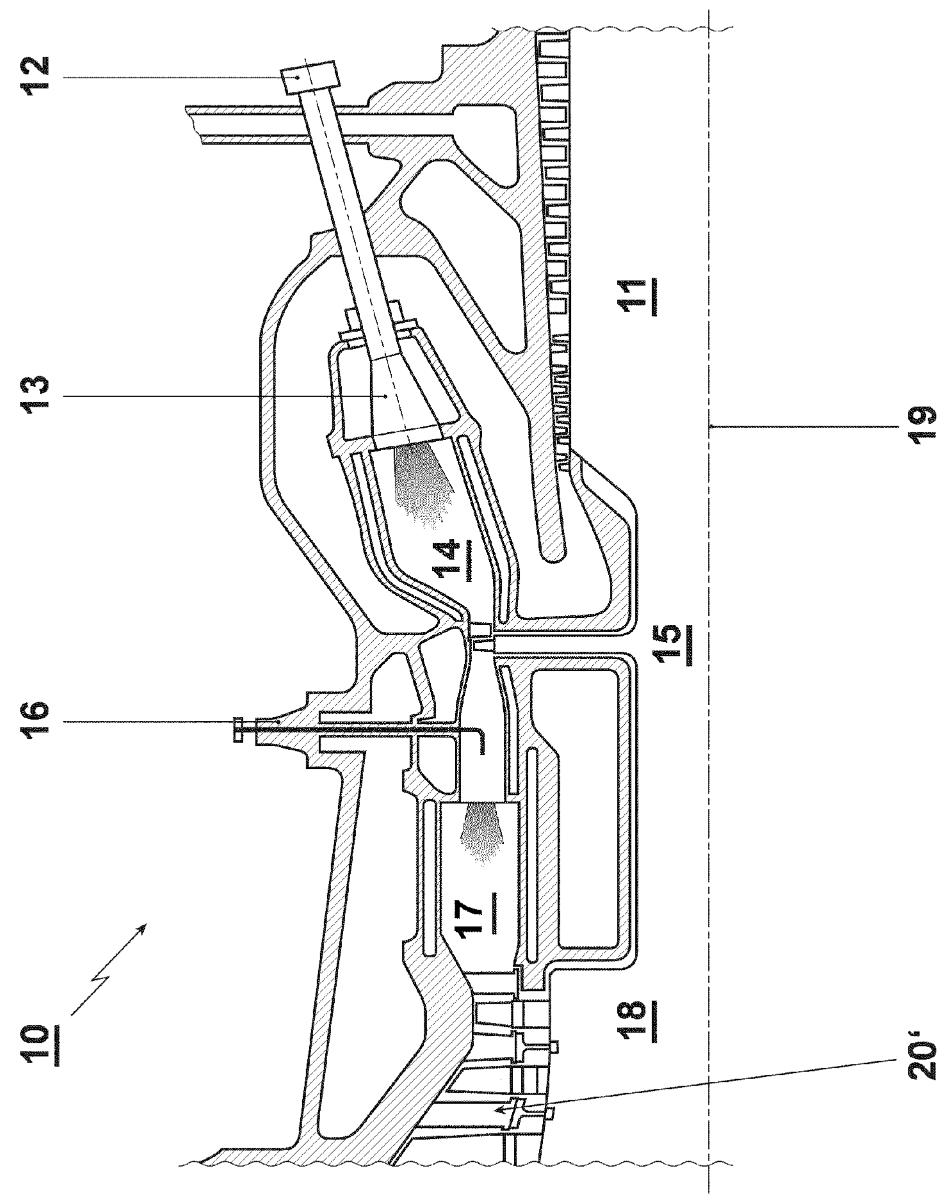
PRIOR ART Fig. 1
FIG. 1 shows the basic construction of a gas turbine having sequential combustion according to the prior art.
Figure 2:
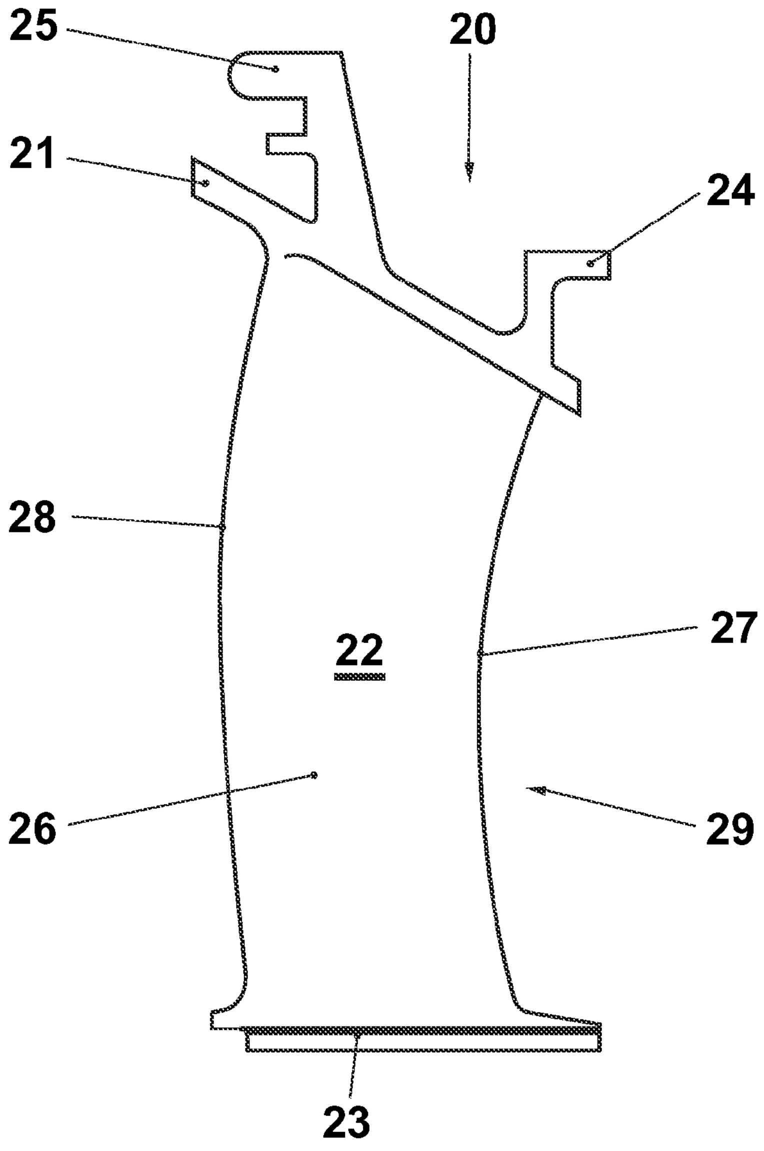
FIG. 2 shows, in a side view of the suction side, a guide blade in the low pressure turbine of a gas turbine having sequential combustion according to FIG. 1 according to a preferred exemplary embodiment of the invention.

A guide blade in the low pressure turbine of a gas turbine having sequential combustion according to FIG. 1 according to a preferred exemplary embodiment of the invention is shown in FIG. 2 in an outer side view. The guide blade 20 comprises a spatially highly curved airfoil 22 which extends in the longitudinal direction (in the radial direction of the gas turbine) between an inner platform 23 and an outer platform 21 and reaches in the direction of the hot gas flow 29 from a leading edge 27 right up to a trailing edge 28. Between the two edges 27 and 28, the airfoil 22 is defined on the outside by a pressure side (in FIG. 2 on the side facing away from the viewer) and a suction side 26. The guide blade 20 is mounted on the turbine casing by means of the hook-like mounting elements 24 and 25 formed on the top side of the outer platform 21, whereas it bears with the inner platform 23 against the rotor in a sealing manner.

Figure 3:
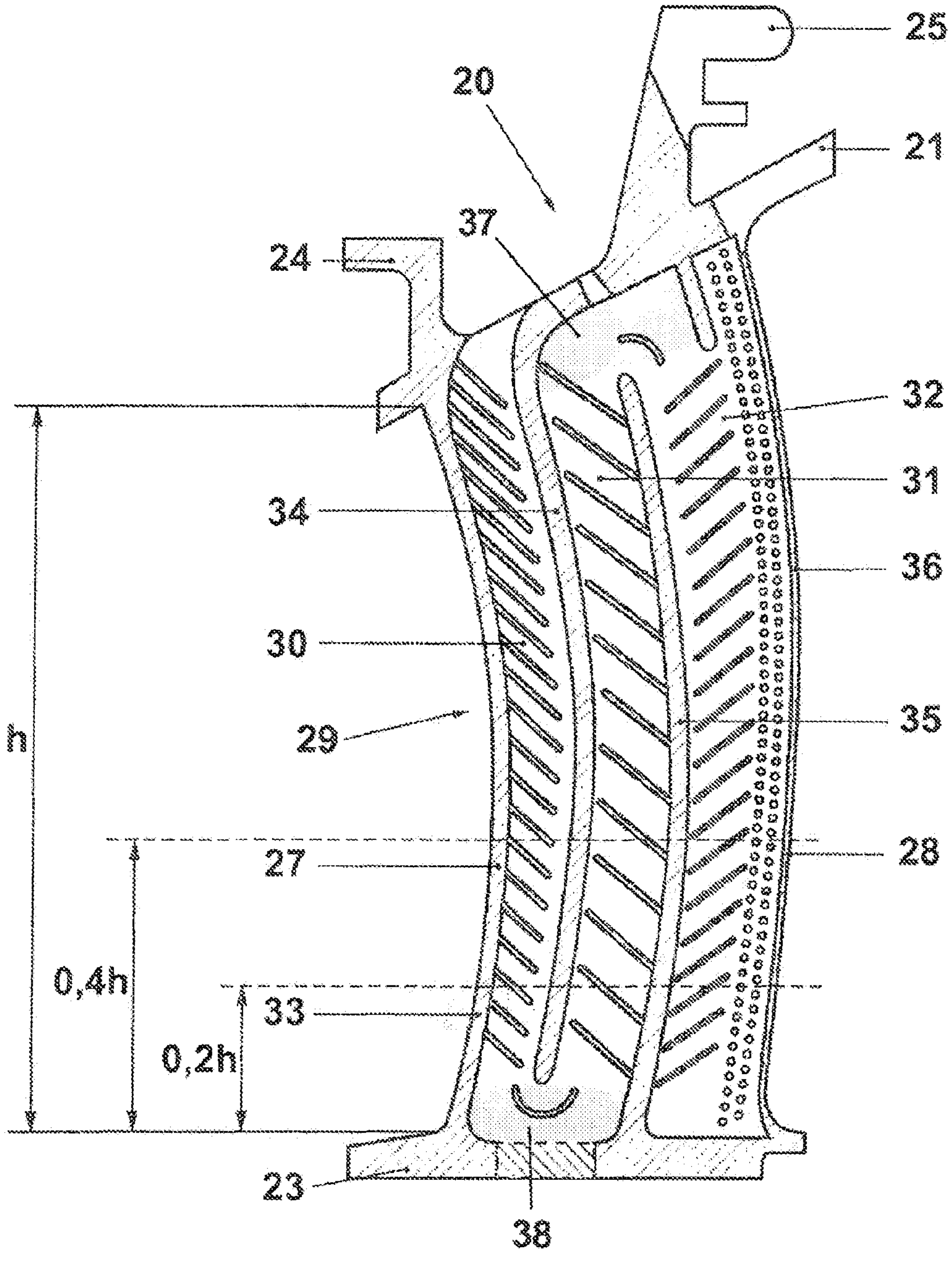
FIG. 3 shows the longitudinal section through the guide blade according to FIG. 2.

The inner construction of the guide blade 20 is shown in FIG. 3: three cooling channels 30, 31, and 32 pass through the airfoil in the longitudinal direction, which cooling channels 30, 31, and 32 follow the spatial curvature of the airfoil, are arranged one behind the other in the direction of the hot gas flow 29 and are connected to one another by deflecting regions 37 and 38, arranged at the ends of the airfoil, in such a way that the cooling medium flows through the cooling channels 30, 31, and 32 one after the other in alternating direction.

The airfoil 22, with its internal cooling channels 30, 31, 32, is defined on the outside by walls 33, 36, while the cooling channels 30, 31, 32 are separated from one another by walls 34 and 35. The total cross-sectional area of the walls 33, . . . , 36 in the radial direction, i.e. in the direction of the height h of the airfoil 22, is obtained as the difference between the airfoil cross section and the cross section of the cooling channels 30, 31, 32. This difference in area is the integral cross-sectional area of the blade material. Since the casting material flows into the casting mold from two sides, namely from the inner platform and the outer platform 23 and 21, respectively, during the casting of the guide blade 20, it is advantageous for the success and precision of the cast part if, in the design of the blade, the cross-sectional area of the blade material varies over the height h by this cross-sectional area in particular passing through a minimum. This minimum of the cross-sectional area is preferably located in the region of between 20% and 40% of the height h of the airfoil 22 or in the region of 0.2 h to 0.4 h, as indicated by the limits in broken lines in FIG. 3.

The form of the airfoil with regard to cross-sectional area, wall thickness, chord length and cooling channel cross section is influenced by this design. With a corresponding distribution of these parameters over the airfoil height, the requirements taken as a basis with regard to the service life of the blade, the cooling achievable and the cooling air consumption are achieved.

With the optimized distribution of the blade material along the airfoil, the occurrence of porosity is minimized during the casting of the blade, a factor which leads to improved efficiency, in particular as far as the cooling is concerned, to an increased service life and to reduced costs during manufacture.

The guide blades according to the invention can be advantageously used in gas turbines having sequential combustion, to be precise in particular in the middle guide blade rows of the low pressure turbine, which is arranged downstream of the second combustion chamber.

LIST OF DESIGNATIONS

10 Gas turbine
11 Compressor
12, 16 Fuel supply
13 EV burner, premix burner
14, 17 Combustion chamber
15 High pressure turbine
18 Low pressure turbine
19 Axis
20, 20' Guide blade
21 Outer platform (shroud)
22 Airfoil
23 Inner platform
24, 25 Mounting element (hook-like)
26 Suction side
27 Leading edge
28 Trailing edge
29 Hot gas flow
30, 31, 32 Cooling channel
33, . . . , 36 Wall (airfoil)
37, 38 Deflecting region
h Height (airfoil)

What is claimed is:

1. A guide blade for a gas turbine, comprising: an inner platform; an outer platform; an airfoil extending in a radial direction between the inner platform and the outer platform and having a height in the radial direction; and at least one cooling channel disposed in an interior of the airfoil and configured to receive a cooling medium flowing through the at least one cooling channel configured to cool the guide blade, wherein a blade material cross-sectional area of the airfoil varies over the height, wherein the blade material cross-sectional area is a difference between an entire guide blade cross-section of the at least one cooling channel, and wherein the blade material cross-sectional area includes a minimum cross-sectional area disposed in a region between 20% and 40% of the height from the inner platform.

2. The guide blade as recited in claim 1, wherein the cooling medium includes air, steam, or air and steam.

3. The guide blade as recited in claim 1, wherein the guide blade has a spatially curved shape in the radial direction, wherein the airfoil includes deflecting regions at each end of the airfoil, wherein the at least one cooling channel includes a first cooling channel, a second cooling channel, and a third cooling channel disposed sequentially, in that order, in a direction of hot gas flow following the spatial curvature of the airfoil, wherein the first cooling channel is connected to the second cooling channel, and the second cooling channel is connected to the third cooling channel, respectively, at one of the deflecting regions, and wherein the cooling medium is configured to flow through the first, second, and third cooling channels, such that the cooling medium flows through the first cooling channel in a first direction, then the cooling medium flows through the second cooling channel in a second direction, which is opposite to the first direction, then the cooling medium flows through the third cooling channel in a third direction, which is opposite to the second direction.

4. The guide blade as recited in claim 1, wherein the cooling medium includes air.

5. The guide blade as recited in claim 1, wherein the cooling medium includes steam.

6. The guide blade as recited in claim 1, wherein the cooling medium includes air and steam.

7. A gas turbine, comprising: a guide blade including an inner platform and an outer platform, an airfoil extending in a radial direction between the inner and the outer platforms and having a height in the radial direction, and at least one cooling channel disposed in an interior of the airfoil and configured to receive a cooling medium flowing through the at least one cooling channel configured to cool the guide blade, wherein a blade material cross-sectional area of the airfoil varies over the height, and wherein the blade material cross-sectional area is a difference between an entire guide blade cross-section and a cross-section of the at least one cooling channel, and wherein the blade material-cross-sectional area includes a minimum cross-sectional area disposed in a region between 20% and 40% of the height from the inner platform.

8. The gas turbine as recited in claim 7, wherein the cooling medium includes air, steam, or air and steam.

9. The gas turbine as recited in claim 7, wherein the guide blade has a spatially curved shape in the radial direction, wherein the airfoil includes deflecting regions at each end of the airfoil, wherein the at least one cooling channel includes a first cooling channel, a second cooling channel, and a third cooling channel disposed sequentially, in that order, in a direction of hot gas flow following the spatial curvature of the airfoil and the first cooling channel is connected to the second cooling and the second cooling channel is connected to the third cooling channel, respectively, at one of the deflecting regions, and wherein the cooling medium is configured to flow through the first, second, and third cooling channels, such that the cooling medium flows through the first cooling channel in a first direction, then the cooling medium flows through the second cooling channel in a second direction, which is opposite to the first direction, then the cooling medium flows through the third cooling channel in a third direction, which is opposite to the second direction.

10. The gas turbine as recited in claim 7, further comprising:

a first combustion chamber;

a high pressure turbine disposed downstream of the first combustion chamber;

a second combustion chamber disposed downstream of the first combustion chamber; and a low pressure turbine disposed downstream of the second combustion chamber, the guide blade disposed in the low pressure turbine.

11. The gas turbine as recited in claim 10, wherein the low pressure turbine includes a plurality of rows of further guide blades disposed one behind the other in a direction of flow, wherein a row of the plurality of the rows of the further guide blades comprises at least one of the guide blade.

12. The gas turbine as recited in claim 7, wherein the cooling medium includes air.

13. The gas turbine as recited in claim 7, wherein the cooling medium includes steam.

14. The gas turbine as recited in claim 7, wherein the cooling medium includes air and steam.

* * * * *